United States Patent
Vitucci

(10) Patent No.: US 12,435,601 B2
(45) Date of Patent: Oct. 7, 2025

(54) MOBILE OFFSHORE CARBON CAPTURE AND SEQUESTRATION SYSTEMS AND METHODS USING JACK-UP STRUCTURE

(71) Applicant: VTEC CONSULTING LLC, Houston, TX (US)

(72) Inventor: John M. Vitucci, Houston, TX (US)

(73) Assignee: VTEC Consulting, LLC, Houston, TX (US)

( * ) Notice: Subject to any disclaimer, the term of this patent is extended or adjusted under 35 U.S.C. 154(b) by 0 days.

(21) Appl. No.: 18/780,654

(22) Filed: Jul. 23, 2024

(65) Prior Publication Data

US 2025/0198258 A1    Jun. 19, 2025

Related U.S. Application Data

(60) Provisional application No. 63/610,525, filed on Dec. 15, 2023.

(51) Int. Cl.
*B01D 53/02*    (2006.01)
*E02B 17/08*    (2006.01)
*E21B 41/00*    (2006.01)

(52) U.S. Cl.
CPC ...... *E21B 41/0064* (2013.01); *E02B 17/0836* (2013.01); *Y02C 20/40* (2020.08); *Y02P 90/70* (2015.11)

(58) Field of Classification Search
CPC .. E21B 41/0064; E02B 17/0836; Y02P 90/70; Y02C 20/40
See application file for complete search history.

(56) References Cited

U.S. PATENT DOCUMENTS

| | | |
|---|---|---|
| 9,751,039 B2 | 9/2017 | Gebald et al. |
| 10,232,305 B2 | 3/2019 | Gebald et al. |
| 10,279,306 B2 | 5/2019 | Gebald et al. |
| 10,427,086 B2 | 10/2019 | Gebald et al. |
| 10,807,042 B2 | 10/2020 | Bijl et al. |
| 11,007,470 B2 | 5/2021 | Wurzbacher et al. |
| 11,045,758 B2 | 6/2021 | Peng |
| 11,285,425 B2 | 3/2022 | Sauerbeck et al. |
| 11,414,962 B2 | 8/2022 | Macdougall |
| 11,420,149 B2 | 8/2022 | Gebald et al. |

(Continued)

FOREIGN PATENT DOCUMENTS

| | | |
|---|---|---|
| DE | 102010026711 A1 | 10/2011 |
| DK | 202000220 A1 | 12/2021 |

(Continued)

OTHER PUBLICATIONS

United States Patent & Trademark Office, Non-Final Office Action in U.S. Appl. No. 18/780,676, pp. 1-24, mailed Dec. 5, 2024.

(Continued)

*Primary Examiner* — Christopher P Jones
(74) *Attorney, Agent, or Firm* — Jeffrey L. Wendt; The Wendt Firm, P.C.

(57) ABSTRACT

Systems and methods for mobile offshore carbon capture and sequestration operations. One system includes a first installation featuring a direct air carbon dioxide capture (DAC) system, carbon dioxide dehydration, carbon dioxide compression and a second installation featuring carbon dioxide injection facilities to inject carbon dioxide into an underground reservoir or other suitable subsurface formation.

17 Claims, 7 Drawing Sheets

(56) References Cited

U.S. PATENT DOCUMENTS

| | | |
|---|---|---|
| 11,612,879 B2 | 3/2023 | Gebald et al. |
| 11,629,577 B2 | 4/2023 | Dockter |
| 11,712,652 B2 | 8/2023 | Spiteri et al. |
| 2003/0168864 A1 | 9/2003 | Heronemus |
| 2008/0202921 A1 | 8/2008 | Wilkinson |
| 2010/0107957 A1 | 5/2010 | Van Loenhout |
| 2011/0171107 A1 | 7/2011 | Britten |
| 2015/0004084 A1 | 1/2015 | Goldberg |
| 2015/0121869 A1 | 5/2015 | McAlister |
| 2015/0315879 A1 | 11/2015 | Williams |
| 2017/0204704 A1 | 7/2017 | Sommerfield |
| 2017/0283014 A1 | 10/2017 | Baker |
| 2018/0119676 A1 | 5/2018 | Maini |
| 2018/0161719 A1 | 6/2018 | Peng |
| 2019/0011565 A1 | 1/2019 | Embry |
| 2019/0264655 A1 | 8/2019 | Maini |
| 2020/0398947 A1 | 12/2020 | Hulsey |
| 2021/0054701 A1 | 2/2021 | Holck |
| 2021/0275960 A1 | 9/2021 | Peng |
| 2022/0241727 A1 | 8/2022 | Dehlsen |
| 2022/0268129 A1 | 8/2022 | Dockter |
| 2023/0009233 A1 | 1/2023 | Lopez et al. |
| 2023/0103018 A1 | 3/2023 | Holck |
| 2023/0191322 A1 | 6/2023 | Shors et al. |
| 2023/0233985 A1 | 7/2023 | Vargas et al. |
| 2023/0256377 A1 | 8/2023 | Gebald et al. |
| 2023/0313988 A1 | 10/2023 | Loseth |
| 2023/0314070 A1* | 10/2023 | Cutler .................. B01D 53/002 |
| | | 62/641 |
| 2023/0390700 A1* | 12/2023 | Besarati ............... B01D 53/265 |
| 2023/0406716 A1* | 12/2023 | Hellesmark .......... B01D 53/229 |
| 2024/0058742 A1 | 2/2024 | Dunn |
| 2024/0060397 A1* | 2/2024 | Tsuji ..................... B01D 53/22 |
| 2024/0279554 A1* | 8/2024 | Boorujy ................. B01D 53/73 |

FOREIGN PATENT DOCUMENTS

| | | |
|---|---|---|
| WO | WO2010149953 A2 | 12/2010 |
| WO | WO2019032646 A1 | 2/2019 |
| WO | WO2021151443 A1 | 8/2021 |
| WO | WO2023194765 A1 | 10/2023 |

OTHER PUBLICATIONS

"AN9003—A User's Guide to Intrinsic Safety", retrieved from the Internet Jul. 12, 2017.

WIPO, International Search Report for PCT/US2024/059582, pp. 1-5, Apr. 2, 2025.

WIPO, Written Opinion of the ISA for PCT/US2024/059582, pp. 1-9, Apr. 2, 2025.

* cited by examiner

```
                                                                    ┌─ 400
402
    A mobile offshore carbon capture and sequestration method,
                    the method comprising:
404
    a) Providing a first offshore installation comprising a floatable hull
    and three or more legs configured to be raised and lowered vertically
    with respect to the floatable hull and engaged with or landed on a
    seafloor, the floatable hull comprising one or more $CO_2$ removal
                        units thereon or therein;
406
    b) Removing $CO_2$ from atmospheric air through direct air capture
                    (DAC), forming captured $CO_2$;
408
    c) Pressurizing the captured $CO_2$ to a pressure P1 sufficient to
    transfer the captured $CO_2$ through one or more transfer conduits
                    to a second offshore installation;
410
    d) Transferring the captured $CO_2$ through the one or more transfer
    conduits to the second offshore installation, where the captured
                $CO_2$ has a pressure P2, where P2<P1;
412
    e) Where pressure P2 is sufficient to inject the captured $CO_2$
    through one or more $CO_2$ injection wells into a subsurface storage
    formation selected from a depleted oil/gas reservoir, a saline
                    aquifer, or other rock strata
```

FIG. 6

MOBILE OFFSHORE CARBON CAPTURE AND SEQUESTRATION SYSTEMS AND METHODS USING JACK-UP STRUCTURE

CROSS-REFERENCE TO RELATED APPLICATIONS

This application is entitled to and claims the benefit of earlier filed provisional application No. 63/610,525 under 35 U.S.C. § 119(e), and may be related to earlier filed provisional application No. 63/610,529, both filed Dec. 15, 2023, which earlier filed provisional applications are expressly incorporated by reference herein in their entireties.

BACKGROUND INFORMATION

Technical Field

The present disclosure relates to systems and processes of using same in the marine (offshore) field. In particular, the present disclosure relates to systems and processes useful for performing carbon capture and sequestration operations employing a jack-up structure.

Background Art

The Paris Agreement is a legally binding international treaty on climate change. Adopted by 196 Parties at the UN Climate Change Conference (COP21) in Paris, France in December 2015 and put into action beginning November 2016. Its overarching goal is to hold the increase in the global average temperature to well below 2° C. above pre-industrial levels and pursue efforts to limit the temperature increase to 1.5° C. above pre-industrial levels. In recent years, world leaders have stressed the need to limit global warming to 1.5° C. by the end of this century. Emissions need to be reduced 45% by 2030 and reach net zero by 2050 to keep global warming to no more than 1.5° C.

Recent modeling indicates emissions reduction plus removal of existing carbon dioxide (CO2) in the atmosphere is required. Carbon removal technologies such as Direct Air Capture (DAC) and Storage/Sequestration (DACS) are key towards achieving this goal.

The United States government has announced that DAC is a component of its overall strategy to reduce CO2. In order for DAC to remove CO2 from the atmosphere in large quantities, suitable geological CO2 storage must be available. Thousands of wells located in the United States Gulf of Mexico (GoM) in both state and federal waters access subsurface rock formations that can store various capacities of CO2 and are logical candidates for storage/sequestration. Some estimate that 80% to 90% of these wells will need to be plugged and abandoned in the next 10 to 20 years. Plug & Abandonment (P&A) of legacy wells is costly to operators. Benefits of using existing offshore wells for large-scale CO2 injection and storage include the fact that reservoirs and wells are characterized with good historical records available. Reservoir pressures are low due to long term production and depletion, reducing injection pressure requirements and high injection pressure risks. Infrastructure is in place from legacy offshore oil and gas production and suitable for CO2 capture and storage.

A typical offshore drilling program employing floating drilling rigs requires significant lead times to plan, design and install the required equipment on the drilling unit. This lead time may be between 6 to 12 months, depending on the complexity of the system design and availability of the components. Additionally, available space on the drilling unit is normally limited, adding to the challenges to locate the equipment, and physically implement any required interconnections. Once installed, the equipment must be inspected, and certified by a classification society (e.g., DNV, ABS, Lloyd's Register, etc.) that provides class certification for the drilling unit. All of these issues would likely pertain to a floating system for carbon capture and sequestration as well.

What would be an advance in the art is a mobile unit that can be landed next to an existing well head platform or facility in up to 500 feet water depth, that uses a conventional jack-up hull form, either a one-deck configuration or a multiple deck configuration with one or more open decks and one or more lower enclosed decks; that house carbon capture systems, renewable energy systems, conventional power generation, compression, and transfer systems; that includes a design that is indifferent to the carbon capture technology selected; and that can optionally be outfitted with accommodations for manned operation, but that ultimately may be operated as a fully automated and non-manned facility.

Various efforts in this area may be exemplified by U.S. Pat. Nos. 11,629,577B2; 11,414,962B2; and U.S. Published patent application nos. 20170283014A1; 20190264655A1; 20180119676A1 20200398947A1; 20110171107A1; 20230191322A1; 20230009233A1; 2015004084A1; 20230103018A1; 2021275960A1; 2022241727A1; 20220268129A1; and DK 202000220A1; WO2010149953A2; WO2021151443A1; and WO2023194765A1. However, none of these documents disclose systems and processes as taught by the present disclosure.

As may be seen, current practice may not be adequate for all circumstances. There remains a need for safe, more robust, mobile offshore carbon capture and sequestration systems and processes. The systems and processes of the present disclosure are directed to these needs.

SUMMARY

In accordance with the present disclosure, mobile offshore carbon capture and sequestration unit (MOCCASU) systems and methods are described which reduce or overcome many of the faults of previously known systems and methods.

A first aspect of the disclosure are systems, comprising:
 a) a first offshore installation comprising
  i) a jack-up structure comprising a floatable hull and three or more legs configured to be raised and lowered vertically and engaged with or landed on a seafloor, and
  ii) the jack-up structure having a CO2 removal system comprising one or more CO2 removal units (including air moving fans and CO2 adsorption and/or absorption units) on or in the floatable hull, one or more CO2 dehydration units, and one or more CO2 compressors, the one or more CO2 removal units configured to remove CO2 from atmospheric air through Direct Air Capture (DAC) and form captured CO2;
 b) one or more transfer conduits fluidly connecting the one or more CO2 compressors with a second offshore installation;
 c) the one or more CO2 compressors configured to transfer the captured CO2 through the one or more transfer conduits to the second offshore installation;

d) the second offshore installation comprising one or more $CO_2$ injection wells configured to route the captured $CO_2$ into a subsurface storage formation selected from a depleted oil/gas reservoir, a saline aquifer, or other rock strata.

A second aspect of the disclosure are methods, comprising:
  a) providing a first offshore installation comprising a floatable hull and three or more legs configured to be raised and lowered vertically with respect to the floatable hull and engaged with or landed on a seafloor, the floatable hull comprising one or more $CO_2$ removal units thereon or therein;
  b) removing $CO_2$ from atmospheric air through Direct Air Capture (DAC), forming captured $CO_2$;
  c) pressurizing the captured $CO_2$ to a pressure P1 sufficient to transfer the captured $CO_2$ through one or more transfer conduits to a second offshore installation;
  d) transferring the captured $CO_2$ through the one or more transfer conduits to the second offshore installation, where the captured $CO_2$ has a pressure P2, where P2<P1;
  e) where pressure P2 is sufficient to inject the captured $CO_2$ through one or more $CO_2$ injection wells into a subsurface storage formation selected from a depleted oil/gas reservoir, a saline aquifer, or other rock strata.

These and other features of the systems and methods of the present disclosure will become more apparent upon review of the brief description of the drawings, the detailed description, and the claims that follow. Systems described herein including the first and second installations are known under the trade designation MOCCASU, which is a trademark of VTEC Consulting LLC, Houston, Texas. All rights reserved. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain systems and methods may be devoid of a bridge. As another example, certain sensors may trigger audible alarms but not visual alarms, and vice versa. It will also be understood that the term "CO2" refers to carbon dioxide, $CO_2$.

BRIEF DESCRIPTION OF THE DRAWINGS

The manner in which the objectives of this disclosure and other desirable characteristics can be obtained is explained in the following description and attached drawings in which:

FIGS. 6 and 7 are schematic logic diagrams of two methods in accordance with the present disclosure.

It is to be noted, however, that the appended drawings of FIGS. 1-5 are not to scale and illustrate only typical system embodiments of this disclosure. Furthermore, FIGS. 6 and 7 illustrate only two of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

Figure 1:
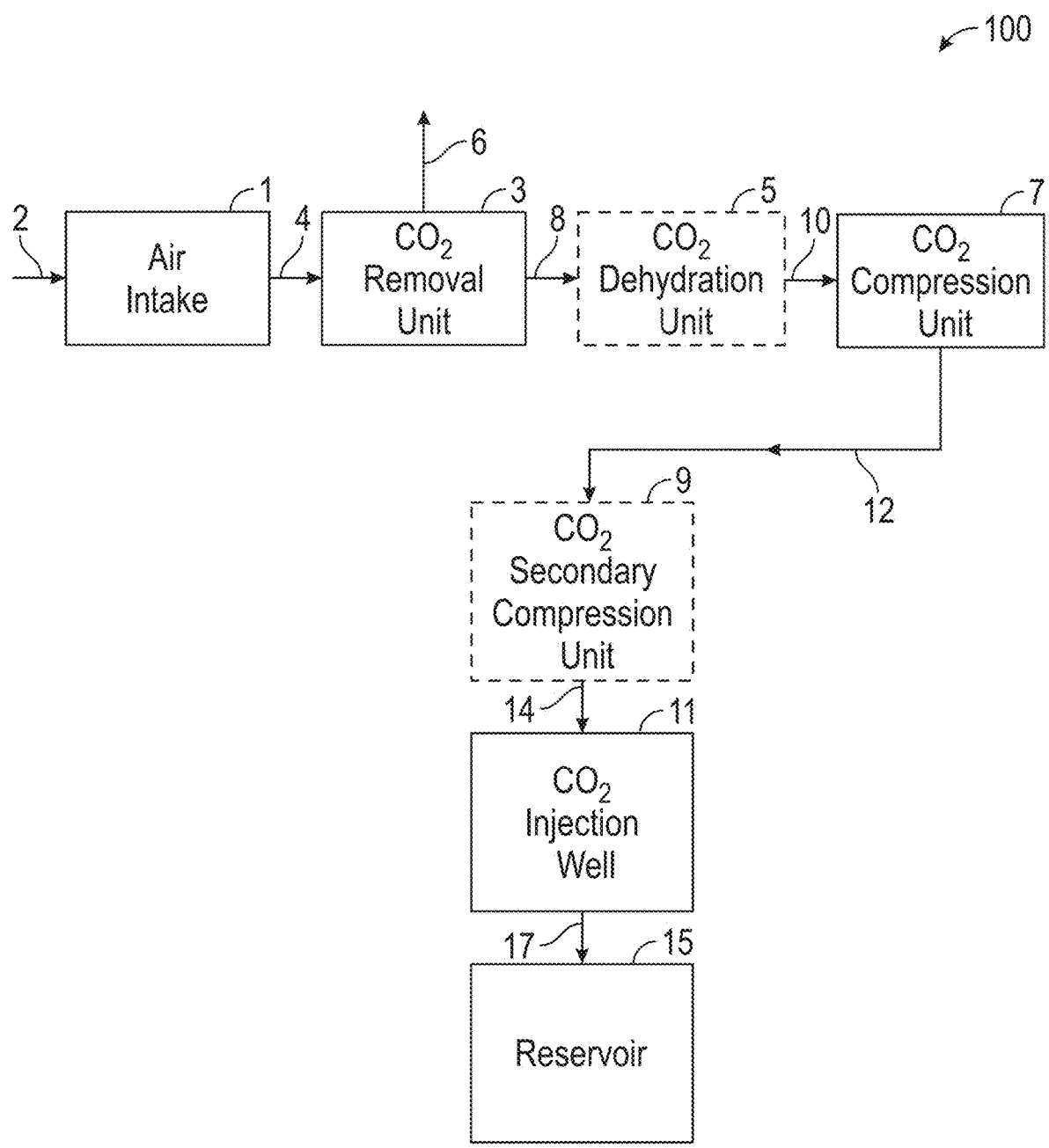
FIG. 1 is a high-level schematic illustrating one system and method embodiment known under the trade designation MOCCASU in accordance with the present disclosure.

In the following description, numerous details are set forth to provide an understanding of the disclosed apparatus, combinations, and processes. However, it will be understood by those skilled in the art that the apparatus, systems, and processes disclosed herein may be practiced without these details and that numerous variations or modifications from the described embodiments may be possible. All technical articles, published and non-published patent applications, standards, patents, U.S. statutes and regulations referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein.

As mentioned herein, what would be an advance in the art is a mobile unit that can be landed next to a well head platform or facility in up to 500 feet water depth, that uses a conventional jack-up hull form, either a one-deck configuration or a multiple deck configuration with one or more open decks and one or more lower enclosed decks; that houses carbon capture systems, renewable energy systems, conventional power generation, compression, and offloading systems; that includes a design that is indifferent to the carbon capture technology selected; and that can optionally be outfitted with accommodations for manned operations, but that ultimately may be operated as a fully automated and non-manned facility. The systems and processes of the present disclosure are directed to these needs.

As described in more detail herein with reference to the various drawing figures, systems and methods (processes) of the present disclosure are comprised of two main components, the first being an installation including a jack-up structure that will be towed or otherwise moved to the desired offshore location of up to 500 feet water depth, and DAC components. The first installation may comprise one or more $CO_2$ dehydration units and one or more $CO_2$ compressors. The location of the first installation relative to the second installation is determined based on the desired application for the system. Factors such as the second installation topsides layout, location of seafloor equipment and foundations, and governing wind and ocean conditions can impact the placement of the first installation.

The second installation of systems and processes of the present disclosure includes a platform having a deck, one or more production wells, and one or more $CO_2$ injection wells.

Transfer conduits fluidly connect the first and second installations, in some embodiments employing a bridge between the first and second installations. While the transfer conduits may be line pipe in certain embodiments, most embodiments will employ flexible hoses or flexible pipe for $CO_2$ and fuel gas (NG, hydrogen and/or NG/Hydrogen mixture) transfer, with $CO_2$ being transferred from the first installation to the second installation, and the fuel gas being transferred from the second installation to the first installation. As used herein "flexible pipe" refers to pipe qualifying under American Petroleum Institute (API) Specification 17J, "Specification for Unbonded Flexible Pipe." As used herein "flexible hose" refers to hose qualifying under API Specification 17K, "Specification for Bonded Flexible Pipe."

The first and second installations as well as the transfer conduits may comprise a combination of: one or more pressure control devices, also referred to as chokes or choke valves; one or more flow measurement devices (also referred to herein as mass flow meters or mass flow sensors); and in certain embodiments one or more accessory equipment such as one or more connectors, one or more isolation valves, one or more pressure relief devices, among others. The specific configuration of the first and second installations defines the capabilities of each system and method embodiment.

Redundancy and/or modularity of components allows for extended service periods and mitigates risk of downtime due to component failure. An example would be a $CO_2$ compressor failing, or a $CO_2$ removal unit plugging. In this case, isolating the failed component and enabling another one allows for continued operations, and enables evaluation and/or modification of the operational parameters to minimize the risk of failure of the new component in use.

Advantageously, most of the components of systems and processes of the present disclosure may be sourced from existing pieces of equipment used in the oil and gas drilling industry or conventional drilling or offshore oil and gas production; from wind energy facilities; from hydro energy facilities; from carbon capture and DAC facilities or other operations. Some of the components of the systems of the present disclosure may be based on existing equipment, which require modifications for MOCCASU operations. The innovative nature of systems and processes of the present disclosure relies on the concept of combining all the carbon capture equipment and renewable energy generation equipment on the first installation, in certain embodiment all or some in modules, and all of the carbon sequestration equipment on the second installation, eliminating the challenges associated with design, fabrication, installation, interconnection, operation and servicing of one installation. The first and second installations of systems and methods of the present disclosure require minimal interfacing, being fluidly connected by the transfer conduits, and in some embodiments by a bridge supporting the transfer conduits.

Systems and methods of the present disclosure may be operated using conventional and/or renewable electric power, and in certain embodiments, such as raising or lower a bridge, hydraulic power. One possible configuration is full renewable electric power to operate the $CO_2$ removal units and conventionally generated electric power (sourced either from an independent source and/or from sources on or in the first installation) to operate $CO_2$ compressors, and hydraulic power to operate the bridge. In certain embodiments, both electric and hydraulic power supply may have redundant and/or back up power supply. In certain embodiments, hydraulic power may require installation of an additional hydraulic unit on the jack-up structure. In certain embodiments, storage for diesel for backup power diesel generators may be present on the jack-up structure. In certain embodiments, electric generators on the first and/or second installations may provide electric power, and backup power may be provided by an uninterruptible power supply (UPS) battery system or other electrical storage system.

In certain systems the $CO_2$ removal unit may be integrated into the jack-up structure.

In certain systems the jack-up structure may comprise a propulsion system integrated into the hull. The propulsion system may include one or more thrusters.

In certain systems the jack-up structure may comprise connections allowing it to be towed to location by a tug or other tow vessel.

In certain systems the jack-up structure may be a new build design. In certain systems the jack-up structure may be a conversion from an existing jack-up installation.

In certain systems the jack-up structure hull and legs may integrate one or more renewable energy systems and equipment to produce electricity and power. In certain systems the one or more renewable energy systems may comprise one or more hydro-turbines configured to be lowered into the water when in operation or raised above the water line during relocation. In certain systems the one or more renewable energy systems may comprise one or more vertical wind turbines integrated into one or more of the legs, and/or may comprise wave energy systems attached to the legs or hull.

In certain systems the one or more $CO_2$ removal systems may comprise:
a) an air intake and transport system configured to move the atmospheric air into the one or more $CO_2$ removal units comprising one or more fans or other equipment used to intake, transport and/or compress air,
b) a dehydration system to remove water from the captured $CO_2$ and form de-watered $CO_2$,
c) the one or more compressors configured to compress the dewatered $CO_2$, and
d) a manifold connecting the one or more compressors to the one or more transfer conduits.

Certain systems may comprise one or more post-combustion $CO_2$ capture systems to remove $CO_2$ from 1) equipment located on the first offshore installation that requires combustion for power generation selected from gas turbines generators (GTGs), diesel engine generators and other similar equipment typically found on offshore installations and 2) fired heaters for heating medium provision. Certain systems may comprise one or more power generation equipment selected from gas turbines generators (GTGs) and diesel engine driven generators to supplement renewable power generation.

Certain systems may comprise one or more fuel reception systems configured to accept natural gas (NG) from the second offshore installation, or from any other source, to use as fuel for generating power. Hydrogen (H2) or a NG/H2 mixture may also be used as a fuel gas.

In certain systems the first offshore installation may comprise electrical equipment to receive electrical power from an independent renewable energy power source selected from one or more seafloor mounted hydro-turbines, one or more wind turbines (floating and/or attached to the seafloor or the power grid that connects various turbines in a offshore wind development), wave or current energy systems, or similar offshore power producing equipment or systems.

In certain systems the first offshore installation may comprise electrical equipment to receive electrical power from the second installation or other electrical power source.

In certain systems the one or more $CO_2$ removal units may be modular and configured to be removed, replaced, or upgraded and disconnected from and connected to decking, mounting structures, or facility foundations of the jack-up structure and other equipment onboard the jack-up structure hull, piping, electrical systems and control systems onboard the jack-up structure hull.

In certain systems the first offshore installation may comprise one or more utilities selected from one or more power generation, conversion and distribution, heating and cooling medium systems, fuel gas treatment, instrument and plant air, nitrogen system, firewater and fire-fighting systems, diesel storage and distribution system and other utility systems supporting operations typically found on offshore facilities.

In certain systems the first offshore installation may be operable in a manned or an unmanned mode.

In certain systems the first offshore installation may comprise living quarters, a potable water system, a wastewater treatment system, an HVAC system and other systems to support manned operations.

In certain systems the first offshore installation may be a modular and scalable design allowing the one or more $CO_2$ removal units capacity to be scaled up and down per the application required.

In certain systems the first offshore installation may be connected to the second offshore installation by a structural bridge to support the one or more $CO_2$ transfer conduits and, optionally, fuel gas provision conduits, electrical power lines, control lines for control interfaces such as Emergency Shutdown (ESD) systems, instrumentation lines, and the like.

In certain systems the one or more $CO_2$ transfer conduits may be selected from line pipe, flexible hose, flexible pipe, or a combination thereof.

Certain systems may further comprise one or more second compressors on or in the second installation configured to boost pressure of the captured $CO_2$ to a pressure sufficient to inject the captured $CO_2$ into the subsurface storage formation.

In certain systems the second installation may be a platform comprising one or more natural gas production wells and one or more $CO_2$ injection wells, and wherein the one or more transfer conduits comprise flexible hoses or flexible pipe configured to be wound and unwound from corresponding hose or pipe reels on the first installation, at least one of the flexible hoses or flexible pipes being a $CO_2$ transfer conduit, and a second flexible hose or flexible pipe being a fuel gas transfer conduit, the system devoid of a bridge supporting the one or more transfer conduits.

In certain systems the second installation may be a platform comprising one or more natural gas production wells and one or more $CO_2$ injection wells, and wherein the one or more transfer conduits comprise flexible hoses or flexible pipes supported by a bridge between the first and second installations, the flexible hoses or flexible pipes configured to be wound and unwound from corresponding hose or pipe reels on the first installation, one of the flexible hoses or flexible pipes being a $CO_2$ transfer conduit, and a second flexible hose or flexible pipe being a fuel gas transfer conduit.

In certain systems the bridge may extend between a top deck of the jack-up structure of the first installation and a platform deck on the second installation that is level with the top deck of the jack-up structure. In certain embodiments the jack-up deck may be raised or lowered to match the elevation of the platform deck of the second installation, which is fixed.

Certain embodiments may comprise one or more accessory equipment selected from the group consisting of one or more connectors, one or more isolation valves, and one or more pressure relief valves. Certain system embodiments may comprise one or more quick connect/quick disconnect connectors.

Certain methods may comprise routing the captured $CO_2$ to a dehydrating unit prior to pressurizing the captured $CO_2$ to pressure P1.

Certain methods may comprise:
a) routing atmospheric air into the one or more $CO_2$ removal units using one or more fans or compressors or other air mover equipment,
b) dehydrating the captured $CO_2$ to remove water from the captured $CO_2$ and form dehydrated $CO_2$,
c) compressing the dehydrated $CO_2$ using a compression system to form compressed, dehydrated $CO_2$, and
d) routing the compressed, dehydrated $CO_2$ via a manifold connecting the compression system to the one or more transfer conduits.

Certain methods may comprise:
a) routing the jack-up structure to the first offshore location;
b) lowering the three or more legs vertically to engage them with a seafloor at the first offshore location.

Certain methods may comprise pressurizing the captured $CO_2$ from pressure P2 to pressure P3, where pressure P3 is sufficient to inject the captured $CO_2$ through the one or more $CO_2$ injection wells into the subsurface storage formation. Certain methods may comprise pressurizing the captured $CO_2$ from P2 to P3 using compression on the second installation. This compression may be accomplished in certain embodiments using compression units temporarily installed on the second installation.

In certain embodiments a logic device may be provided to control one or more systems, sub-systems, and/or components, such as $CO_2$ removal units, compressors, wind turbines, GTGs, and the like. Logic devices may be configured to be operated and/or viewed from a Human/Machine Interface (HMI) wired or wirelessly connected to the logic device. Certain embodiments may include one or more audio and/or visual warning devices configured to receive communications from the logic device upon the occurrence of a pressure rise (or fall) in a sensed pressure above (or below) a set point pressure, or a change in concentration of one or more sensed concentrations or temperatures, or both, above one or more set points. The occurrence of a change in other measured parameters outside the intended ranges may also be alarmed in certain embodiments. Other measured parameters may include, but are not limited to, gas or liquid mass flow rate, gas or liquid volume flow rate, gas or liquid density, gas or liquid pressure, gas or liquid temperature.

Certain system and method embodiments of this disclosure may operate in modes selected from the group consisting of automatic continuous mode, automatic periodic mode, and manual mode.

In certain embodiments, pressure (P) and/or temperature (T) may be sensed on inlet and outlet of DAC systems, dehydration units, compressors, transfer manifolds and inside transfer conduits. Different sensor strategies may be used on each component, sub-system, or system, for example, a first type of mass flow sensor for sensing mass flow inside a $CO_2$ transfer conduit, another sensing mass flow inside a fuel gas transfer conduit. All combinations of sensing T, P, and/or mass flow inside and/or outside one or more components, systems, and sub-systems are disclosed herein and considered within the present disclosure.

With respect to "jack-up structure" and "platform", these terms have generally understood meaning in the art (see for example the patent documents and technical articles cited herein, such as US20230103018A1) and the terms connote sufficient structure to persons of ordinary skill in the art. "Jack-up" means a structure including a floatable hull and legs, perpendicular to the hull and movable vertically with respect to the hull. A "jack-up structure" as used herein means a jack-up with structure including a floatable hull and legs, perpendicular to the hull and movable vertically with respect to the hull, and having sufficient structural strength to support (and in some embodiments enclosing) accommodations, cranes, $CO_2$ removal systems, including air intake units, $CO_2$ removal units, $CO_2$ dehydrators, $CO_2$ compressors, hose and/or pipe reels, wind turbines, wave energy systems, gas turbine generators, diesel generators, in certain embodiments a bridge, and associated components, for example, but not limited to pressure control devices (backpressure valves), pressure relief devices (valves or explosion discs), pipes, conduits, vessels, towers, tanks, mass flow meters, temperature and pressure indicators, heat exchangers, pumps, and quick connect/quick disconnect (QC/QD) features for connecting and disconnecting transfer conduits to $CO_2$ removal systems, and the like. A "platform" as used herein, when referring to the second installation, includes a structure having a deck supporting at minimum one $CO_2$ injection well, and in certain embodiments sufficient structure to support at least one production well (natural gas), at least one $CO_2$ injection well, and associated equipment. A "platform" as used herein means a structure rigidly affixed to the seafloor and underlying sediment, soils and rock using a foundation system.

The pressure P1 produced by the $CO_2$ compressor on the first installation may, in some embodiments, range from about 500 psi to about 5,000 psi or greater; alternatively greater than about 700 psi; alternatively greater than about 800 psi; alternatively greater than about 1,000, or greater than about 2,000 psi, or greater than about 3,000 psi. For example, pressure P1 may range from about 2,000 to about 5,000 psi; or from about 2,500 to about 4,500 psi; or from about 3,000 to about 4,000; or from about 2,500 to about 5,000 psi; or from about 2,000 to about 4,500 psi; or from about 2,000 to about 3,000 psi; or from about 4,000 to about 5,000 psi; or from about 3,000 to about 5,000 psi. Pressure P2 depends largely on the pressure drop experienced in the $CO_2$ transfer conduit. P3 could be the same as P2 (no secondary compression) or greater (secondary compression is used), depending on the reservoir pressure conditions. In other words, P3 will only occur when secondary compression on the second installation is being used. Otherwise P3=P2, and P2 and P3 will be a pressure sufficient to inject captured $CO_2$ into the formation at a given flowrate. All ranges and sub-ranges (including endpoints) between about 500 psi and about 5,000 psi are considered explicitly disclosed herein.

In certain embodiments, the $CO_2$ removal system, or components thereof, may be configured or located on one or more of the jack-up structure decks, and/or in a dedicated container or containers fabricated for this purpose.

As explained herein, in certain embodiments reels may be employed on the first installation to store and handle flexible transfer conduits (flexible hose and/or flexible pipe). One embodiment may comprise: 1) one or more reels for the $CO_2$ transfer conduit or conduits, with hydraulic lines for operating all valves and components of the first installation, including the $CO_2$ removal system, and low power electric connections for data transmission for sensors (e.g., pressure, temperature, mass flow rate, among others); and 2) a reel for the fuel gas transfer conduit and one or more electric cables to provide power for operating valves and components on the first installation, as well as low power electric connections for data transmission for sensors (e.g., pressure, temperature, mass flow rates, fluid density, among others). In these embodiments, the reels for the $CO_2$ transfer conduit or conduits and the fuel gas conduit may also be designed to provide mechanical support for holding some or all the weight of the $CO_2$ transfer conduit or conduits and fuel gas transfer conduit, respectively, while being placed, and/or during operation, and/or when retrieved.

With respect to data connection/integration, in certain embodiments control signals for the components of systems of the present disclosure, as well as parameters measured or captured by the system's sensors (e.g., pressures, temperatures, fluid flow rates and density, etc.) may be transmitted to and from control rooms on the first installation from and to the second installation. In certain embodiments, the control lines may provide the means for this data transmission. On the first installation, the data may be integrated at different levels, potentially with different control systems. This integration may be similar to data connection and integration with a drilling rig's systems currently implemented on various drilling systems. Examples of control systems which can potentially integrate data to and from the systems of the present disclosure include control systems for $CO_2$ removal/DAC operations), renewable energy generation, storage, usage, and the like, conventional energy generation, distribution, storage, and the like. In certain embodiments, data integration may require running cables between different locations on the first installation and/or the second installation. Industry standards, operator requirements, and/or local laws may dictate cable routing configurations.

Figure 2:
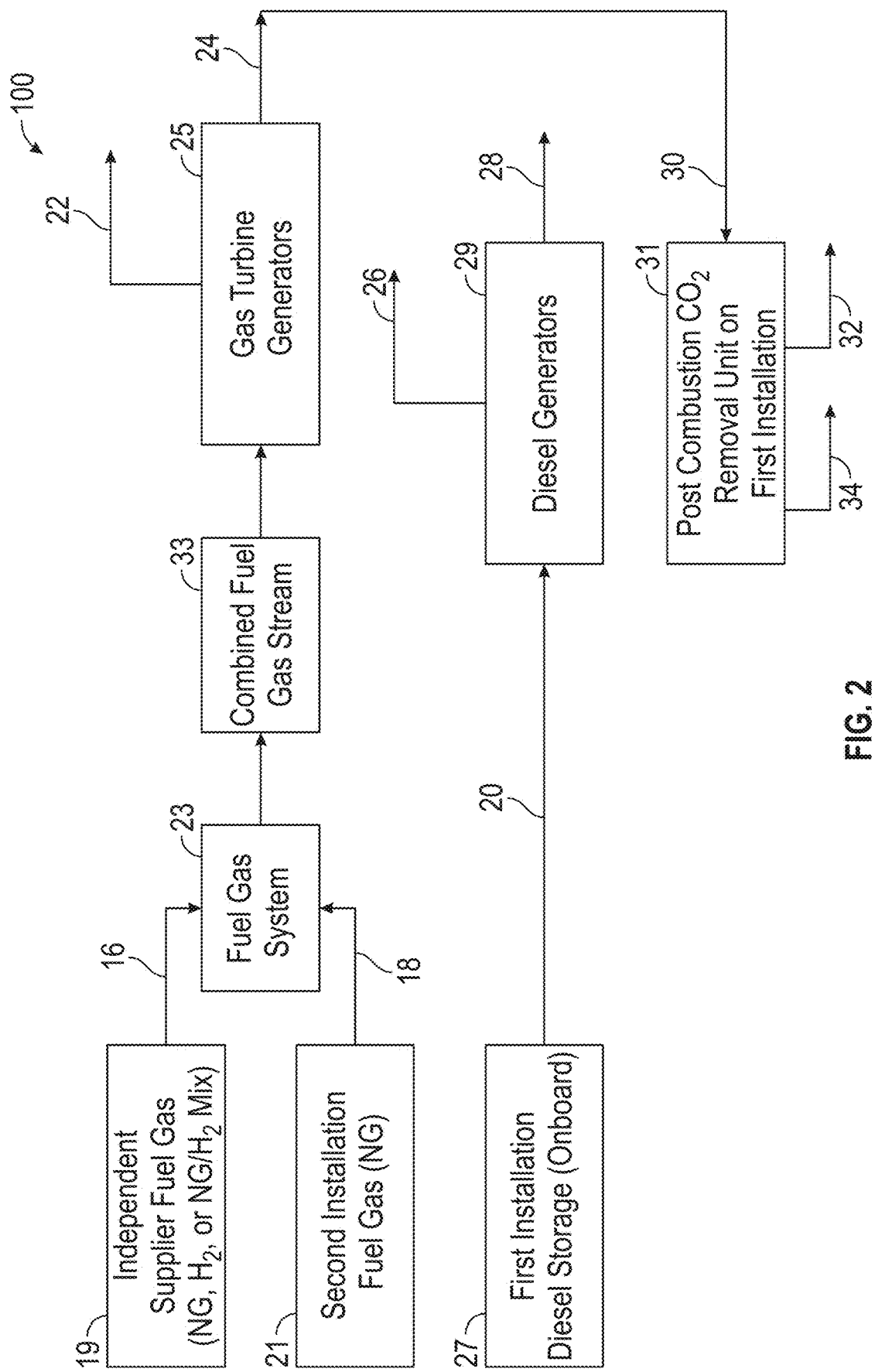
FIG. 2 is a schematic utility flow diagram of the embodiment of FIG. 1, illustrating fuel flow for power generation in accordance with the present disclosure.
Figure 3:
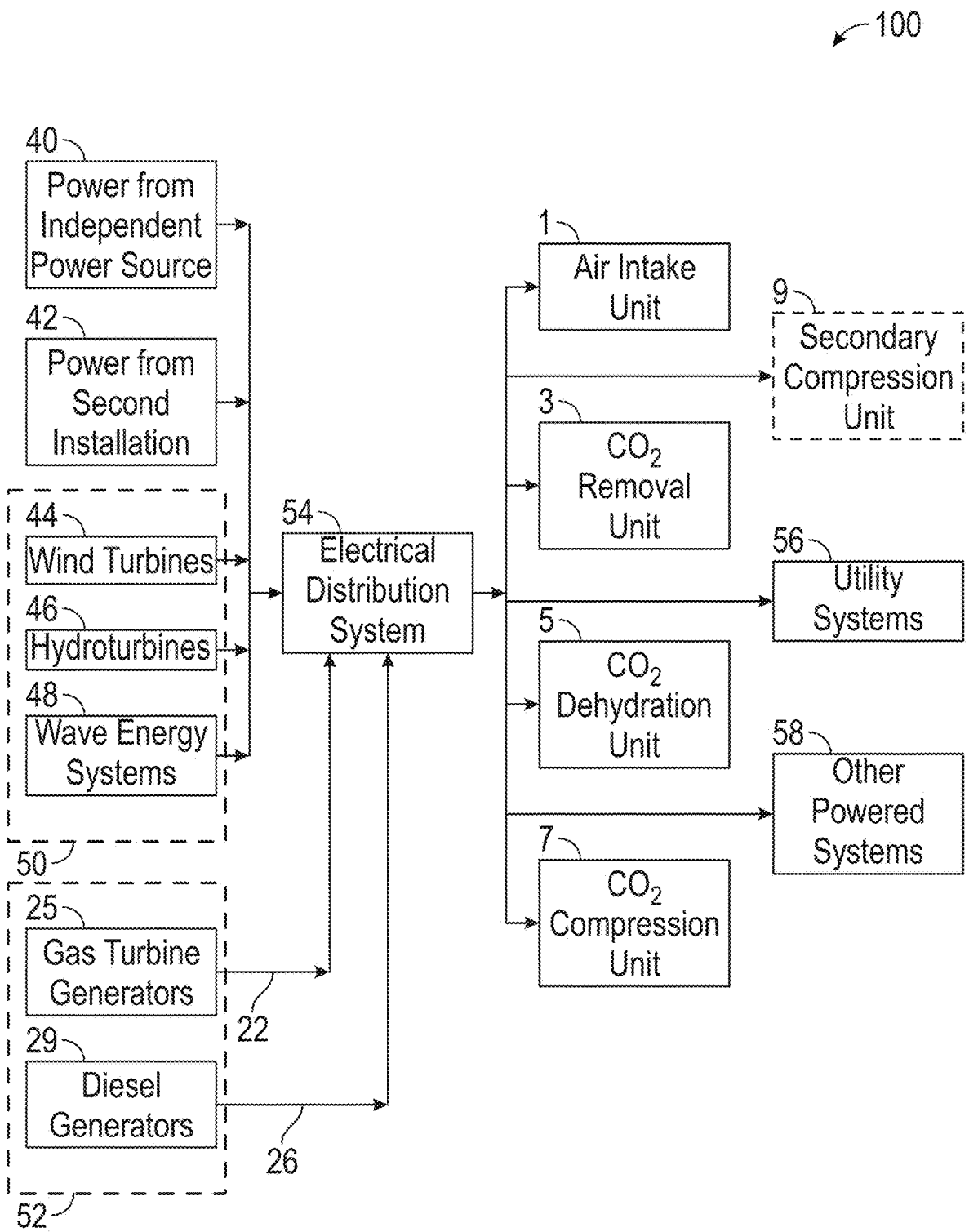
FIG. 3 is a schematic utility flow diagram of the embodiment of FIGS. 1 and 2, illustrating electricity generation and distribution in accordance with the present disclosure.

Referring now to the drawing figures, FIG. 1 is a high-level schematic diagram illustrating one system and method embodiment 100 known under the trade designation MOC-CASU in accordance with the present disclosure. FIG. 2 is a schematic utility flow diagram of embodiment 100 of FIG. 1, illustrating fuel flow for power generation in accordance with the present disclosure. FIG. 3 is a schematic utility flow diagram of embodiment 100 of FIGS. 1 and 2, illustrating electricity generation and distribution in accordance with the present disclosure. Embodiment 100 includes an air intake 1, a $CO_2$ removal unit 3, a $CO_2$ dehydration unit 5 (optional in certain embodiments as indicated by the dashed box), a $CO_2$ compression unit 7 (compressor), a $CO_2$ secondary compression unit 9 (optional in certain embodiments as indicated by the dashed box), and a $CO_2$ injection well 11. Air intake 1, $CO_2$ removal unit 3, $CO_2$ dehydration unit 5, $CO_2$ compression unit 7 (compressor), and $CO_2$ secondary compression unit 9 (and associated conduits and controls for each) may all be modular.

Still referring to FIG. 1, air intake 1 accepts an atmospheric air stream 2 and produces an air inlet stream 4 that serves as feed to one or more $CO_2$ removal units 3, which in turn produces a $CO_2$ depleted air stream 6 and a captured $CO_2$ stream 8. In certain embodiments, some or all of captured $CO_2$ stream 8 may be routed to optional dehydration unit 5 to produce a dehydrated, captured $CO_2$ stream 10. Compression unit 7 increases pressure of captured $CO_2$ stream 8 or dehydrated, captured $CO_2$ stream 10 (or mixture thereof) to produce a pressurized, dehydrated, captured $CO_2$ stream 12 having pressure P1 at an inlet to one or more $CO_2$ transfer conduits 12. $CO_2$ drops in pressure from P1 at entry to $CO_2$ transfer conduit 12 to P2 at exit of $CO_2$ transfer conduit 12 and entry to $CO_2$ injection well 11, or entry to $CO_2$ secondary compression unit 9. In embodiments where $CO_2$ secondary compression unit 9 is employed it will form stream 14, optionally, to compress the dehydrated, captured CO2 from P2 to P3, if needed, where P2<P3. A compressed, dehydrated, captured CO2 stream 17 is routed in to CO2 injection tree and riser (sub-components of CO2 injection well 11) and is injected into a subsurface wellbore 15 and subsequently a reservoir or other formation for sequestration.

FIG. 2 is a schematic utility flow diagram of embodiment 100 of FIG. 1, illustrating one possible fuel flow scheme for power generation in accordance with the present disclosure, and FIG. 3 is a schematic utility flow diagram of embodiment 100 of FIGS. 1 and 2, illustrating one possible electricity generation and distribution scheme in accordance with the present disclosure.

Referring to FIG. 2, a fuel gas stream 16 may be received by a fuel gas system 23 on the first installation from an independent supplier (not on second installation) as exemplified in FIG. 2 by box 19. A fuel gas stream 18 (natural gas or H2) may be received by fuel gas system 23 from the second installation, as exemplified in FIG. 2 by box 21. Fuel gas system 23 forms a combined fuel gas stream 33 that may serve as feed fuel gas to one or more gas turbine generators (GTGs), 25, on the first installation, which produce power 22 for first installation systems and a post combustion gas stream 24. A diesel fuel stream 20 from first installation diesel storage 27 may be received by one or more diesel generators 29 on the first installation to produce electric power 26 for first installation systems. A post combustion exhaust gas stream 28 from diesel generators 29 may be combined with post combustion gas stream 24 to form a combined post combustion gas stream 30, which may then be routed to a post combustion CO2 removal unit 31 on the first installation, which produces a CO2 depleted combustion gas stream 32 that is vented to atmosphere, and a CO2 rich stream 34 that is routed to the CO2 dehydration unit 5 (FIG. 1) on the first installation.

Referring now to FIG. 3, where it will be understood that all lines and arrows connecting the boxes are electricity flow in this schematic illustration, power may be received by an electrical distribution system 54 on the first installation from:
  an independent power source, as exemplified by box 40; and/or
  the second installation, as exemplified by box 42; and/or
  one or more wind turbines 44 on the first installation (for example, attached to or built into the legs of the jack-up structure); and/or
  one or more hydroturbines 46 retractably or non-retractably attached to the first installation (for example, either the hull or the legs, or both, of the jack-up structure); and/or
  one or more wave energy systems 48 retractably or non-retractably attached to the first installation (for example, either the hull or the legs, or both, of the jack-up structure); and/or
  one or more GTG 25 on the first installation; and/or
  one or more diesel generators 29 on the first installation.

The wind turbines 44, hydroturbines 46, and/or wave energy systems 48 may be deemed a renewable energy source or sources, 50, onboard first installation, as exemplified by the dashed line surrounding boxes 44, 46, and 48 in FIG. 3. The GTGs 25 and diesel generators 29 may be deemed a combustion power source or sources 52 onboard first installation, as exemplified by the dashed line surrounding boxes 25 and 29.

Still referring to FIG. 3, electrical distribution system 54 distributes electricity to air intake unit 1, CO2 removal unit 3, optional CO2 dehydration unit 5, and CO2 compressor 7, as well as to utility systems 56 and other powered systems 58 onboard the first installation. Optionally, electricity may be distributed to the CO2 secondary compression unit 9 on the second installation.

Figure 4:
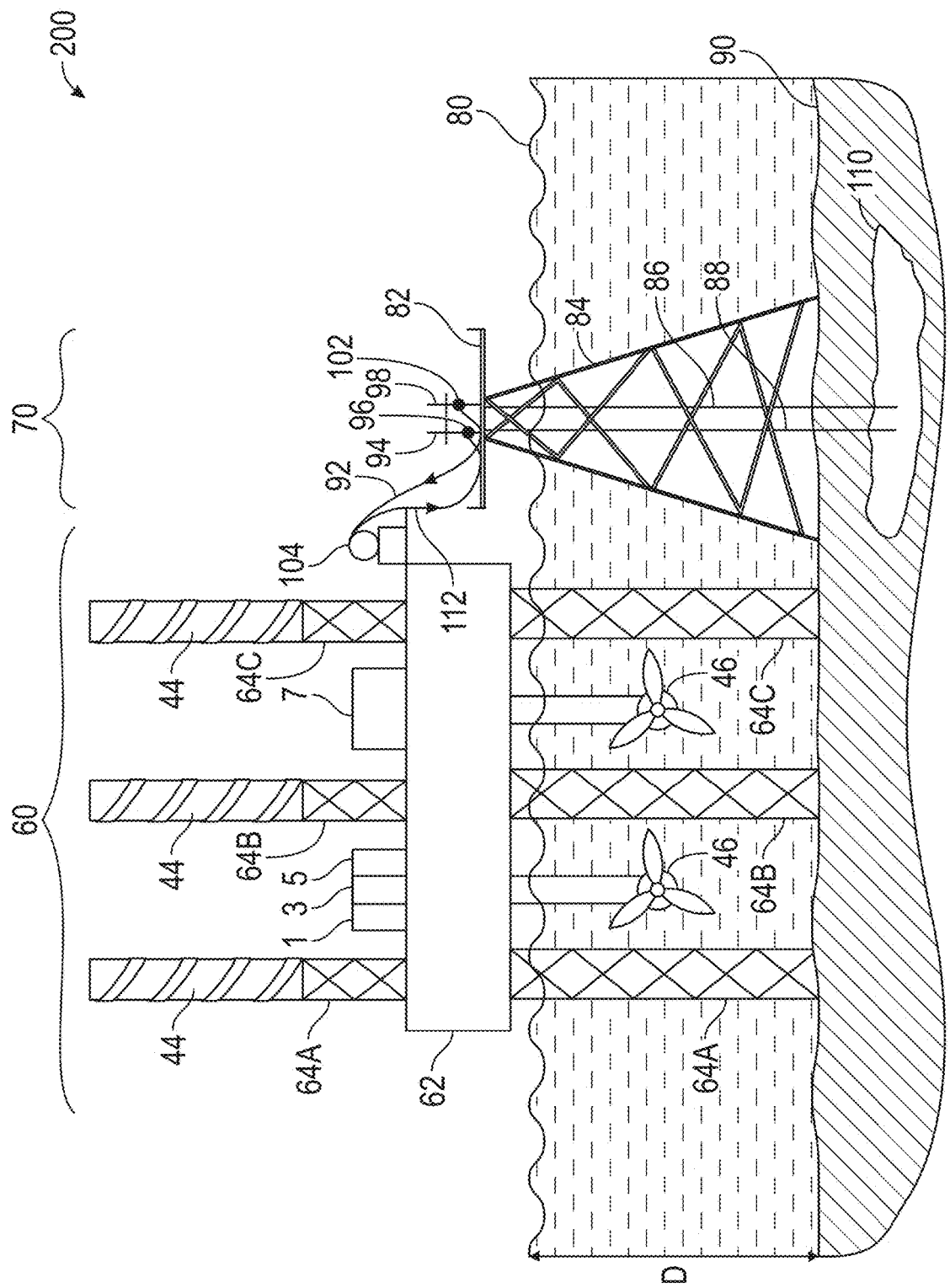
FIG. 4 is a schematic side elevation view of an embodiment employing a first installation including a jack-up structure and a second installation including a platform structure, without a connecting bridge therebetween, in accordance with the present disclosure.

FIG. 4 is a schematic side elevation view of an embodiment 200 employing a first installation 60 including a jack-up structure, and a second installation 70 including a platform structure, without a connecting bridge therebetween, in accordance with the present disclosure. The jack-up structure includes a floatable hull and deck 62 and legs 64A, 64B, and 64C in embodiment 200, it being understood that more than three legs could be employed. The floatable hull and deck 62 may include living accommodations in certain embodiments. Illustrated schematically in FIG. 4 is a water surface 80 and seabed or seafloor 90, and water depth D, as indicated by the double-headed arrow and is the difference in water depths between the water surface 80 and seabed or seafloor 90. Water depth D may range from about 50 to about 500 feet (about 15 to about 150 meters). As illustrated schematically in FIG. 4, one wind turbine 44 is mounted atop each of legs 64A, 64B, and 64C in embodiment 200, it being understood that some, all, or none of the legs may have a wind turbine attached thereto, depending on the embodiment. Similarly, a pair of hydroturbines 46 are illustrated schematically as attached to hull 62, it being understood that more or less than two, or none at all may be present depending on the embodiment. In certain embodiments, hydroturbines 46 may be retractable, for example, during movement of the jack-up structure, or during unfavorable weather conditions. Air intake 1, CO2 removal unit 3, optional CO2 dehydration unit 5, and CO2 compressor 7 are illustrated as present on the deck of hull 62 in embodiment 200. This is but one possible deck arrangement but illustrates the modularity aspect of the different units. Each unit may be easily accessed and replaced or repaired if necessary.

Still referring to FIG. 4, a deck 82 of the platform of second installation 70 is illustrated supported by a support structure 84 secured to or in the seafloor 90. A natural gas (NG) production well conduit 86 and a CO2 injection well conduit 88 are illustrated, both fluidly connected to a reservoir 110. It will be understood that reservoir 110 in FIG. 4 is simplified for brevity: CO2 injection and NG production will take place from either 1) two separate and distinct reservoirs, or 2) isolated and distinct zones within one reservoir. Although the reservoir 110 is illustrated in FIG. 4 as directly underneath second installation 70, this need not be the case in all embodiments. A flexible transfer conduit 92 connects NG production well tree 98 via a connector 102 on second installation 70 to first installation 60 via a reeled flexible conduit (flexible hose or flexible pipe) 104. A flexible CO2 transfer conduit 112 connects CO2 compression unit 7 (FIG. 1) on first installation 60 via reeled flexible transfer conduit 104, with CO2 injection well 94 on second installation 70 through a connector 96.

Figure 5:
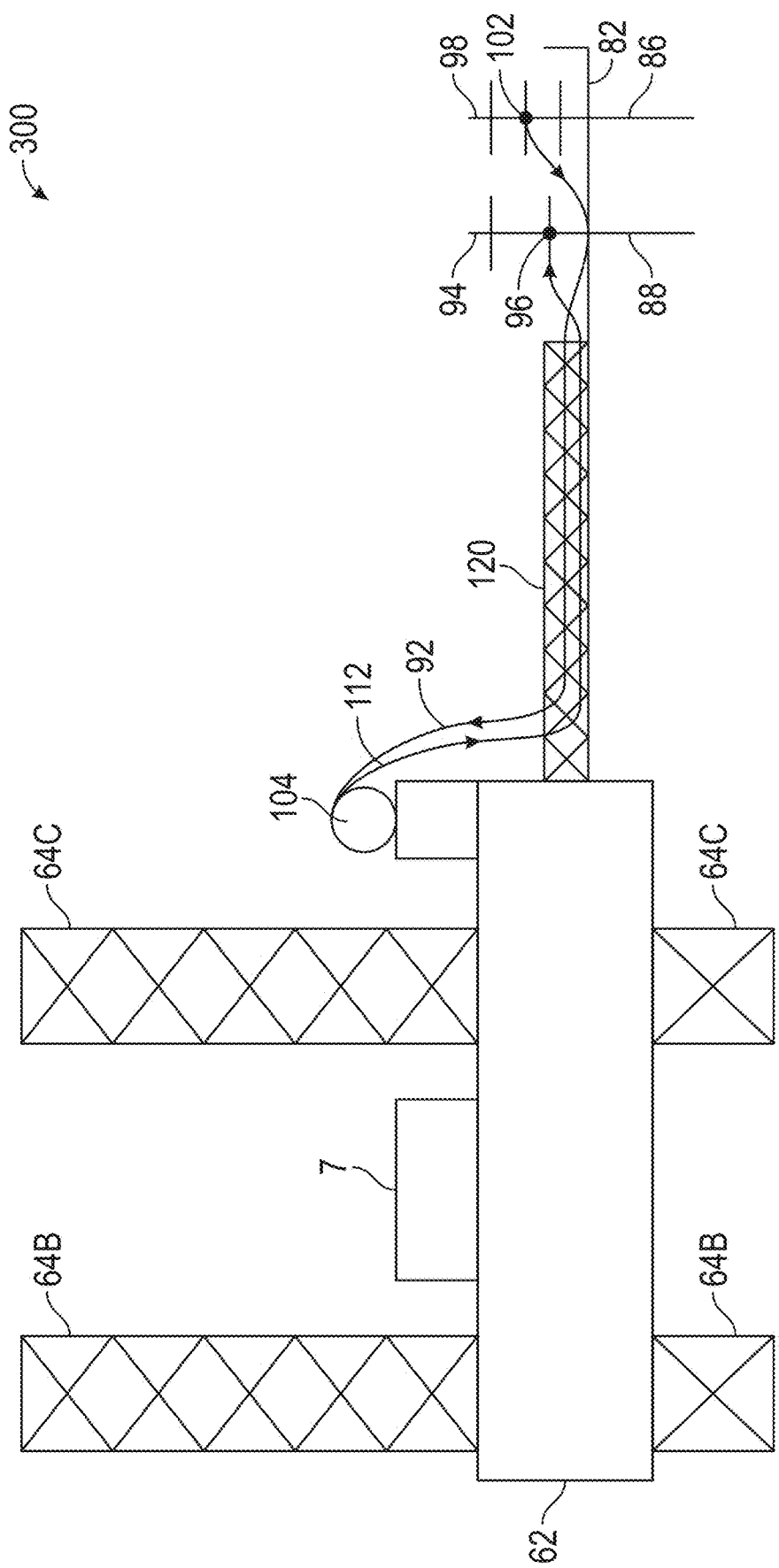
FIG. 5 is a close up view of another embodiment, similar to the embodiment illustrated schematically in FIG. 4, but including a bridge connecting the first and second installations, in accordance with the present disclosure.

FIG. 5 is a schematic close up view of another embodiment 300, similar to embodiment 200 illustrated schematically in FIG. 4, but including a bridge 120 connecting the first and second installations, 60, 70 in accordance with the present disclosure. Bridge 120 supports transfer conduits 92, 112, and, in certain embodiments, may also support electrical power conduits (power lines or power cables), data transfer lines, and the like.

Figure 7:
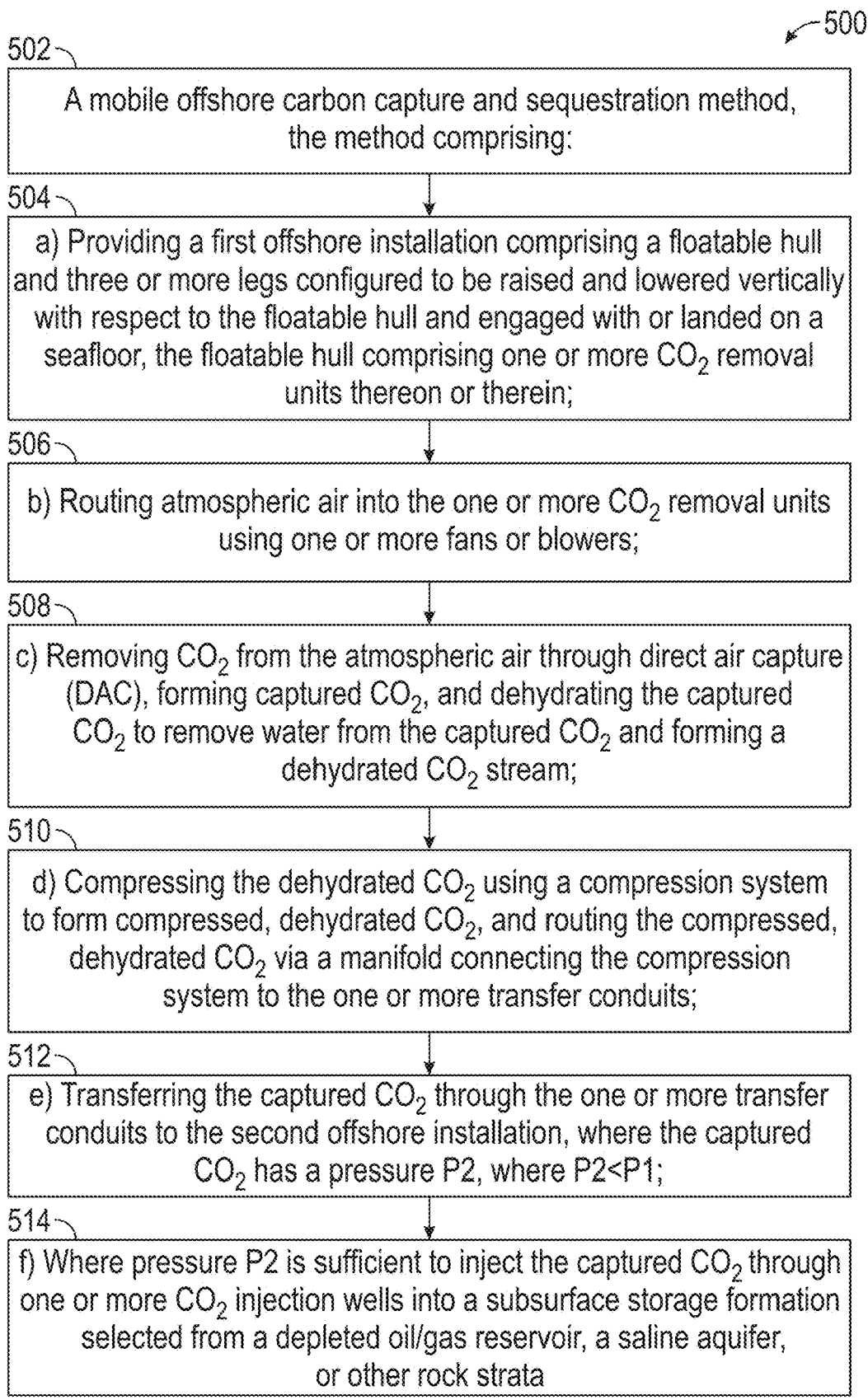

FIGS. 6 and 7 are schematic logic diagrams of two non-limiting method embodiments 400 and 500 in accordance with the present disclosure. Method embodiment 400 is a mobile offshore carbon capture and sequestration method (box 402), including the steps of a) providing a first offshore installation comprising a floatable hull and three or more legs configured to be raised and lowered vertically with respect to the floatable hull and engaged with or landed on a seafloor, the floatable hull comprising one or more $CO_2$ removal units thereon or therein (box 404); b) removing $CO_2$ from atmospheric air through Direct Air Capture (DAC), forming captured $CO_2$ (box 406); c) pressurizing the captured $CO_2$ to a pressure P1 sufficient to transfer the captured $CO_2$ through one or more transfer conduits to a second offshore installation (box 408); d) transferring the captured $CO_2$ through the one or more transfer conduits to the second offshore installation, where the captured $CO_2$ has a pressure P2, where P2<P1 (box 410); e) where pressure P2 is sufficient to inject the captured $CO_2$ through one or more $CO_2$ injection wells into a subsurface storage formation selected from a depleted oil/gas reservoir, a saline aquifer, or other rock strata (box 412).

Method embodiment 500 illustrated in FIG. 7 is a mobile offshore carbon capture and sequestration method (box 502), including the steps of a) providing a first offshore installation comprising a floatable hull and three or more legs configured to be raised and lowered vertically with respect to the floatable hull and engaged with or landed on a seafloor, the floatable hull comprising one or more $CO_2$ removal units thereon or therein (box 504); b) routing atmospheric air into the one or more $CO_2$ removal units using one or more fans or blowers (box 506); c) removing $CO_2$ from the atmospheric air through Direct Air Capture (DAC), forming captured $CO_2$, and dehydrating the captured $CO_2$ to remove water from the captured $CO_2$ and form a dehydrated $CO_2$ stream, (box 508); d) compressing the dehydrated $CO_2$ using a compression system to form compressed, dehydrated $CO_2$ at pressure P1, and routing the compressed, dehydrated $CO_2$ via a manifold connecting the compression system to one or more transfer conduits (box 510); e) transferring the captured $CO_2$ through the one or more transfer conduits to a second offshore installation, where the captured $CO_2$ has a pressure P2, where P2<P1 (box 512); and f) where pressure P2 is sufficient to inject the captured $CO_2$ through one or more $CO_2$ injection wells into a subsurface storage formation selected from a depleted oil/gas reservoir, a saline aquifer, or other rock strata (box 514).

Certain system embodiments may include some support equipment to enable further functionality. This support equipment may be similar to equipment designed for some other uses in the marine drilling and offshore production industry. For example, certain systems and processes of the present disclosure may include further additional reels (not illustrated) containing umbilical/control lines for one or more systems or sub-systems on the first installation. These reels may be installed around the moon pool (if present), if space is available, in the hull and/or on the deck 62 of the jack-up structure. Alternatively, the reels may be installed on the sides of hull 62 of the jack-up structure. In general, flexible hose or flexible pipe reels (including hose or pipe reel 104) may be designed for enough tensile capacity and running capacity which allows for planning to retrieve and run back the equipment at any time during operations for service. Smaller pieces of equipment may be installed, such as hydraulic power supply, and/or electric main and backup power supply for control of various components. For this purpose, commonly available equipment may be used, provided its design allows for the intended use with the systems and methods of the present disclosure.

One benefit of systems and methods of the present disclosure is there is minimal to no modifications required to enable virtually any jack-up structure to perform DAC operations. Once the system is built, there will be minimal time to install on the jack-up structure. The modular nature of the components reduces extensive planning, assessing location, interconnection, pipe routing, modification to existing pipe, deck loads, penetrations, etc. For non-modular systems it is not uncommon that the system design undergoes several iterations and modifications as result of design and engineering maturation and risk assessment as part of the planning process. Once the planning is completed, fabrication and installation starts, which takes significant time. Critical path installation time is carefully minimized, however significant portions of the installation are required to be performed on critical path, resulting in costly downtime. After installation is completed, commissioning, approval and certification process require inspection of welds, pressure testing of the equipment and lines, and audits to validate the final installation as per planned. Only then, and after careful review of documentation, the class certification can be issued.

In contrast, the systems and methods of the present disclosure may be engineered to be self-contained in modular units. The systems may be transported to the jack-up structure, installed and run temporarily, without need for modification to the jack-up structure's equipment, or interconnections with the jack-up structure's other equipment. This represents significant cost and time savings. No additional class certification for the $CO_2$ removal system would be needed, if the systems of the present disclosure are certified by competent bodies.

It will be understood by those skilled in this art that companies listed in the following discussion typically perform design, engineering, procurement, and construction management, while contracted shipyards perform fabrication and integration. Any known type of quick connect/quick disconnect (QC/QD) connector may be employed in practicing the systems and methods of the present disclosure. Suitable QC/QD connectors include those discussed in U.S. Pat. No. 5,645,106 and are currently commercially available from Maxbar Incorporated, Houston Texas (U.S.A.) under the trade designation 84 SERIES.

Any known type of flexible hose or flexible pipe may be employed in practicing the systems and methods of the present disclosure. Suitable examples include those currently commercially available from TechnipFMC, London, UK; NOV, Houston, Texas; and Baker Hughes, Houston, Texas. Suitable marine fluid transfer systems, such as hose reel systems and cantilever A-frame systems, include those currently commercially available from SafeRack, Andrews, South Carolina, and Palfinger Marine, Salzburg, Austria. These systems may comprise their own electro/hydraulic power unit, PLC control and monitoring systems, ICS interfaces, and/or foundation/deck loading analysis.

Any known type of mass flow meter may be employed in practicing the systems and methods of the present disclosure. Suitable mass flow meters and components typically used therewith include the coriolis flow and density meters currently commercially available from Emerson (under the trade designation ELITE Peak Performance Coriolis Flow and Density Meter) and other suppliers.

Any known type of pressure relief component (Pressure Relief Valve (PRV), or other) may be employed in practicing the systems and processes of the present disclosure. Suitable pressure relief components include those currently commercially available from Expro, London (U.K.) under the trade designation PRV MAX. Any known type of pressure control device may be employed in practicing the systems and processes of the present disclosure, including systems known under the trade designation POWERCHOKES, commercially available form Expro, London, (U.K.). Suitable chokes include those available from Expro, London (U.K.) under the trade designation POWERCHOKES.

Any known type of compressor may be employed in practicing the systems and methods of the present disclosure. Suitable compressors include centrifugal compressors available from Atlas Copco, Stockholm, Sweden; reciprocating, internally geared, and single shaft centrifugal compressors available from Siemens Energy, Munich, Germany; and reciprocating, turbo, and screw compressors available from MAN Energy Solutions, Houston, Texas.

Any known type of fan or blower (air movers) may be employed in practicing the systems and methods of the present disclosure. Suitable fans and blowers include those available from Chart Industries, Ball Ground, Georgia; and those available from Croft Systems, Needville, Texas, under the trade designation SPECIALTY SERIES.

Any known type of CO2 dehydrator may be employed in practicing the systems and methods of the present disclosure. Suitable dehydrators include those available from Axens, Rueil-Malmaison Ile-de-France (absorption drying equipment that utilizes liquid triethylene glycol (TEG) or other as its dehydrating agent to remove water from a hydrocarbon vapor stream flowing over it; or proprietary adsorbent solutions); and NOV, Houston, Texas (TEG systems, molecular sieve systems utilizing temperature swing adsorption (TSA) systems, and TSA systems that utilize the aluminosilicate gel adsorbent known under the trade designation SORBEAD, from BASF).

Suitable DAC CO2 removal units include those currently commercially available from Climeworks Zurich, Switzerland. Some or all of these commercially available DAC CO2 removal units may be described in U.S. Pat. Nos. 11,420, 149; 10,232,305; 11,612,879; 10,807,042; 11,285,425; 11,007,470; 10,279,306; 9,751,039; 11,712,652; 10,427, 086, and other patents. Materials for use in such units may be described in U.S. Published Patent App. Nos. 20230233985 and 20230256377. The '985 document describes solid inorganic or organic, non-polymeric or polymeric support material functionalized on the surface with amino functionalities capable of reversibly binding carbon dioxide, with a specific BET surface area, preferably measured by nitrogen adsorption, in the range of 1-20 $m^2/g$.

Suitable post-combustion CO2 removal systems include those currently commercially available from NOV, Houston, Texas (based on amine CO2 absorption/desorption technology); Babcock & Wilcox, Akron, Ohio, under the trade designation SOLVEBRIGHT (based on amine CO2 absorption/desorption technology); cryogenic CO2 removal systems from Chart Industries, Ball Ground, Georgia; and Mitsubishi Heavy Industries, Chiyoda, Japan (based on amine CO2 absorption/desorption technology).

Suitable vertical wind turbines for use in systems and methods of the present disclosure include those commercially available from Sea Twirl, Gothenburg, Sweden, for example their 1 MW Model 52x Vertical Shafted turbines.

Suitable hydroturbines and wave energy systems for use in systems and methods of the present disclosure include those commercially available from Orbital Marine Power Ltd., Orkney, UK, including their Orbital O2 2MW units.

Suitable gas turbine generators for use in systems and methods of the present disclosure include various models commercially available from GE, New York, New York; Rolls Royce, London, England; and Solar Turbines, San Diego, California.

Suitable diesel generators for use in systems and methods of the present disclosure include various models commercially available from NOV, Houston, Texas; CAT Offshore & Marine, Irving, Texas; and MAN Energy Solutions, Houston, Texas.

Suitable jack-up hulls for use in systems and methods of the present disclosure include those commercially available from NOV, Houston, Texas under the trade designation CJ43; Transocean, Vernier, Switzerland (built to customer specifications); and Diamond Offshore Drilling, Houston, Texas (built to customer specifications).

Suitable control systems, which would be custom-built for use in systems and methods of the present disclosure include those commercially available from Emerson, St Louis, Missouri; Honeywell, Charlotte, North Carolina; and Yokogawa, Masashino, Japan.

Suitable living quarters for use in systems and methods of the present disclosure include those custom-built and available from Leirvik, Leirvik, Stord, Norway, and modular and custom-built units available from STACO Shinhwa, Gyeongsangnam-do, Korea.

During a MOCCASU operation, one or all of T, P, mass flow rate, gas or vapor concentrations (or percentages of set point values) may be displayed locally on Human Machine Interface (HMI), such as a laptop computer having display screen having a graphical user interface (GUI), or handheld device, or similar. In certain embodiments the HMI may record and/or transmit the data via wired or wireless communication to another HMI, such as a laptop, desktop, or hand-held computer or display. These communication links may be wired or wireless.

One or more control strategies may be employed, as long as the strategy includes measurement of CO2 pressures P1, P2, and optionally P3, and those measurements (or values derived from those measurements) are used in controlling the systems and/or methods described herein. A pressure process control scheme may be employed, for example in conjunction with the CO2 compressor, pressure control devices, and mass flow controllers. A master controller may be employed, but the disclosure is not so limited, as any combination of controllers could be used. Programmable logic controllers (PLCs) may be used.

Components described herein may be built to meet ISO standards, Det Norske Veritas (DNV) standards, American Bureau of Standards (ABS) standards, American Petroleum Institute (API) standards, American Society of Mechanical Engineers (ASME) and/or other standards used in the offshore and marine industries.

The electrical connections, if used (voltage and amperage) will be appropriate for the zone rating desired of the system. In certain embodiments one or more electrical cables may be run and connected to an identified power supply on the first installation to operate the control system, CO2 removal system, and other components. Certain embodiments may employ a dedicated power supply. The identified or dedicated power supply may be controlled by one or more logic devices so that it may be shut down. In exemplary embodiments, systems of the present disclosure may have an electrical isolation (lockout) device on a secure cabinet.

In embodiments where connection to one or more remote HMI units is desired, this may be achieved by an intrinsically safe cable and connection so as to allow system components to operate in the required zoned area. If no remote access is required, power to operate the control system, CO2 removal system, and other components may be integral to the apparatus, such as batteries, for example, but not limited to, Li-ion batteries. In these embodiments, the power source may be enclosed allowing it to operate in a zoned area (Zone 0 (gases) in accordance with International Electrotechnical Commission (IEC) processes). By "intrinsically safe" is meant the definition of intrinsic safety used in the relevant IEC apparatus standard IEC 60079-11, defined as a type of protection based on the restriction of electrical energy within apparatus and of interconnecting wiring exposed to a potentially explosive atmosphere to a level below that which can cause ignition by either sparking or heating effects. For more discussion, see "AN9003—A User's Guide to Intrinsic Safety", retrieved from the Internet Jul. 12, 2017, and incorporated herein by reference.

In certain embodiments, internal algorithms in the logic device, such as a PLC, may calculate a rate of increase or decrease in pressure inside equipment or transfer conduits. This may then be displayed or audioed in a series of ways such as "percentage to shutdown" lights or sounds, and the like on one or more GUIs. In certain embodiments, an additional function within a HMI may be to audibly alarm when the calculated pressure rate of increase or decrease reaches a level set by the operator. In certain embodiments this alarm may be sounded inside the control room on the first installation (if present), outside the control room, as well as remote from the first or second installations, for example in a remote control room.

Systems, sub-systems, transfer conduits, cabinets therefore, logic devices, sensors, valves, and optional safety shutdown units should be capable of withstanding long term exposure to probable liquids and vapors, including carbon dioxide, hydrocarbons, acids, acid gases, fluids (oil-based and water-based), solvents, brine, anti-freeze compositions, hydrate inhibition chemicals, and the like, typically encountered in offshore and subsea processing facilities.

What has not been recognized or realized are systems and methods for mobile offshore carbon capture and sequestration that are robust and safe. Systems and methods to accomplish this without significant risk to workers is highly desirable. As explained previously, systems and processes exist, but they are not necessarily economical and involve interconnection with existing deck equipment on the first and/or second installations. The present inventor, however, personally knows of the inefficiencies of such practices.

In alternative embodiments, the components need not be rectangular, as illustrated in the drawings, but rather the CO2 removal system could take any shape, such as a box or cube shape, elliptical, triangular, prism-shaped, hemispherical or semi-hemispherical-shaped (dome-shaped), or combination thereof and the like, as long as the pressure sensors, safety shutdown system, logic devices, and the like have suitable fittings to connect (either via wired or wireless communication) to a data acquisition system, control system and power source. It will be understood that such embodiments are part of this disclosure and deemed within the claims. It will be understood that embodiments where each piece of equipment that must be hoisted on to or removed from a deck of the first installation will have sufficient lifting points, for example lifting eyes, and/or anchor points. Furthermore, one or more of the various components may be ornamented with various informational and/or safety ornamentation produced in various ways (for example stamping or engraving, or raised features such as reflectors, reflective tape, patterns of threaded round-head screws or bolts screwed into holes in the CO2 removal system), such as facility designs, operating company designs, logos, letters, words, nicknames (for example MOCCASU, and the like). Some components may include optional hand-holds, which may be machined or formed to have easy-to-grasp features for fingers or may have rubber grips shaped and adorned with functional and/or safety features, such as raised knobby gripper patterns.

Thus the systems and methods described herein provide ways to perform mobile offshore carbon capture and sequestration operations safely and economically, and with significantly reduced risk to property and equipment and injury and discomfort to workers.

From the foregoing detailed description of specific embodiments, it should be apparent that patentable systems, combinations, and methods have been described. Although specific embodiments of the disclosure have been described herein in some detail, this has been done solely for the purposes of describing various features and aspects of the systems and processes, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to take an existing non-jack-up structure and modify it to include features of a jack-up structure and other components and connections mentioned herein to allow performance of the methods of this disclosure. Some systems of this disclosure may be devoid of certain components and/or features: for example, systems devoid of a bridge; systems devoid of low-strength steels; systems devoid of threaded fittings; systems devoid of welded fittings; jack-up structures devoid of more than three legs.

The invention claimed is:

1. A system comprising:
a) a first mobile offshore installation comprising
   i) a mobile jack-up structure comprising a floatable hull and three or more legs configured to be raised and lowered vertically and engaged with or landed on a seafloor in up to 500 feet water depth, and
   ii) the mobile jack-up structure having a CO2 removal system integrated therein or thereon comprising one or more CO2 removal units installed or mounted on or in the floatable hull, one or more CO2 dehydration units, and one or more CO2 compressors, the one or more CO2 removal units configured to remove CO2 from atmospheric air through Direct Air Capture (DAC) and form captured CO2;
b) one or more transfer conduits fluidly connecting the one or more CO2 compressors with a second offshore installation, the first mobile offshore installation configured to be connected to the second offshore installation by a structural bridge to support the one or more CO2 transfer conduits;
c) the one or more CO2 compressors configured to transfer the captured CO2 through the one or more transfer conduits to the second offshore installation;
d) the second offshore installation comprising one or more CO2 injection wells configured to route the captured CO2 into a subsurface storage formation selected from a depleted oil/gas reservoir, a saline aquifer, or other rock strata.

2. The system of claim 1 wherein the one or more CO2 removal units is or are integrated into the jack-up structure.

3. The system of claim 1 wherein the jack-up structure comprises a propulsion system integrated into the hull.

4. The system of claim 1 wherein the jack-up structure hull and legs integrate one or more renewable energy systems and equipment to produce electrical power.

5. The system of claim 4 wherein the one or more renewable energy systems comprises one or more hydro-turbines configured to be lowered into the water when in operation or raised above the water line during relocation or non-operational periods.

6. The system of claim 4 wherein the one or more renewable energy systems comprises one or more vertical wind turbines integrated into one or more of the legs, and wave energy systems attached to the legs or hull.

7. The system of claim 1 wherein the one or more CO2 removal units comprises:
   a) an air intake and transport system configured to move the atmospheric air into the one or more CO2 removal units,
   b) the one or more CO2 dehydration units is configured to remove water from the captured CO2 and form dehydrated CO2,
   c) the one or more compressors are configured to compress the dehydrated CO2, and
   d) a manifold connecting the one or more compressors to the one or more transfer conduits.

8. The system of claim 1 comprising one or more post-combustion CO2 capture systems integrated into the one or more CO2 removal units configured to remove CO2 from atmospheric air through Direct Air Capture (DAC) to remove CO2 from 1) equipment located on the first mobile offshore installation that requires combustion for power generation selected from gas turbines generators (GTGs), diesel engine generators and other similar equipment typically found on offshore installations and 2) fired heaters for heating medium provision.

9. The system of claim 4 comprising one or more power generation equipment selected from gas turbines generators (GTGs) and diesel engine driven generators to supplement renewable power generation.

10. The system of claim 1 comprising one or more fuel reception systems configured to accept fuel gas from the second offshore installation, or from any other source, to use as fuel for generating power.

11. The system of claim 1 wherein the first mobile offshore installation comprises electrical equipment to receive electrical power from an independent renewable energy power source selected from one or more seafloor mounted hydro-turbines, one or more wind turbines (floating and/or attached to the seafloor or the power grid that connects various turbines in an offshore wind development), wave or current energy systems, or similar offshore power producing equipment or systems.

12. The system of claim 1 wherein the first mobile offshore installation comprises electrical equipment to receive electrical power from the second offshore installation or other electrical power source.

13. The system of claim 1 wherein the one or more CO2 removal units are modular and configured to be removed, replaced, or upgraded and disconnected from and connected to decking mounting structures or facility foundations of the jack-up structure and other equipment onboard the jack-up structure hull, piping, electrical systems and control systems onboard the jack-up structure hull.

14. The system of claim 1 wherein the first mobile offshore installation is a modular and scalable design allowing the one or more CO2 removal units capacity to be scaled up and down per the application required.

15. The system of claim 1 wherein the second offshore installation is a platform comprising one or more natural gas production wells and one or more CO2 injection wells, and wherein the one or more transfer conduits comprise flexible hoses and/or flexible pipes configured to be wound and unwound from corresponding hose reels on the first mobile offshore installation, one of the flexible hoses and/or flexible pipes being a CO2 transfer conduit, and a second flexible hose and/or or flexible pipe being a fuel gas transfer conduit.

16. The system of claim 1 wherein the second offshore installation is a platform comprising one or more natural gas production wells and one or more CO2 injection wells, and wherein the one or more transfer conduits comprise flexible hoses and/or flexible pipes supported by the bridge between the first mobile offshore installation and the second offshore installation, the flexible hoses and/or flexible pipes configured to be wound and unwound from corresponding hose reels on the first mobile offshore installation, one of the flexible hoses and/or flexible pipes being a CO2 transfer conduit, and a second flexible hose and/or flexible pipe being a fuel gas transfer conduit.

17. The system of claim 16 wherein the bridge extends between a top deck of the jack-up structure and a platform deck that is level with the top deck of the jack-up structure.

* * * * *